Benjamin Greening's Machine for Manufacturing Wire Fencing.
117275
PATENTED JUL 25 1871
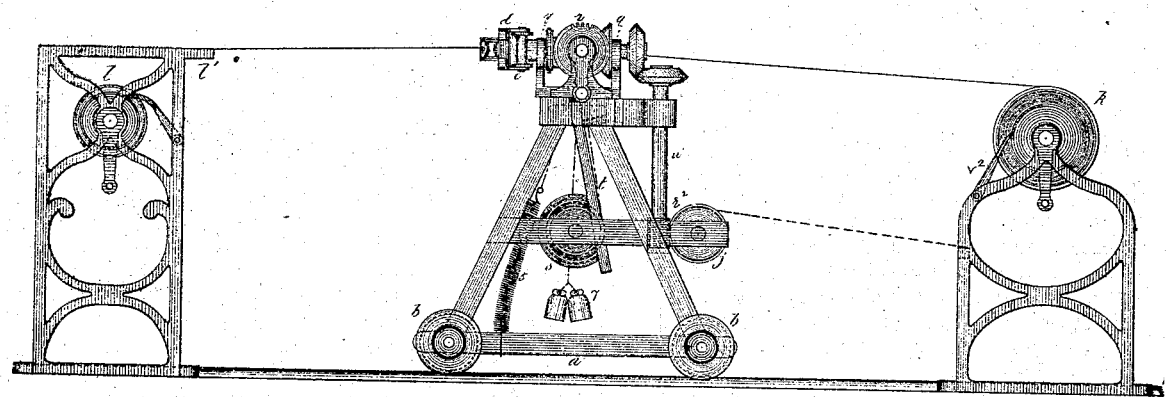
Fig 1. Side Elevation
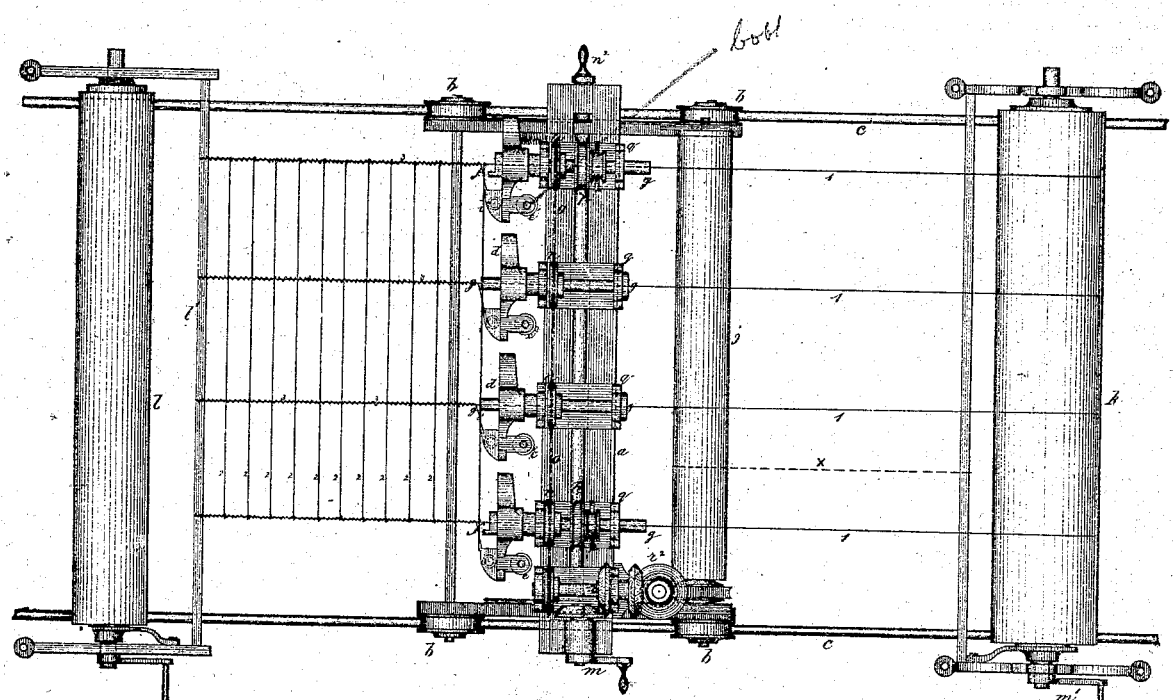
Fig 2. Plan of Machine

UNITED STATES PATENT OFFICE.

BENJAMIN GREENING, OF HAMILTON, CANADA, ASSIGNOR TO SAMUEL OWEN GREENING, OF SAME PLACE.

IMPROVEMENT IN MACHINES FOR MAKING WIRE FENCING.

Specification forming part of Letters Patent No. 117,275, dated July 25, 1871.

*To all whom it may concern:*

Be it known that I, BENJAMIN GREENING, of the city of Hamilton, in county of Wentworth, in the Province of Ontario, Canada, have invented a certain new and useful Machine for the Construction and Manufacture of Wire Fences, of which the following is a specification:

Figure 1 represents a side elevation of the machine embodying my invention, and Fig. 2 is a plan of the same.

$a$ represents a substantial movable iron frame, which is made to run on a track, $c\,c$, by means of the four grooved wheels, $b\,b\,b\,b$, attached as shown. Upon the top of the frame $a$ are placed four or more head-stocks, $q\,q\,q\,q$. On each head-stock there is a wrapper, $d$. Each wrapper has a hollow shaft, $g$, running through it and revolving in the head-stock; a bobbin, $e$, for holding the lacing-wire; a friction-roller, $i$, to take the strain from the lacing-wire when in operation. Each wrapper has also a cog-wheel, $h$, keyed on the shaft $g$, over and under which runs an endless chain, $o$, for driving them. The wrappers $d$ all revolve at the same time by means of the bevel-gears $r\,r$, set in motion by the crank $m$. The two outer wrappers on the machine are supplied with pulleys $p$, which are keyed on the shaft $g$, and are by a chain connected to cams $s$, which work levers $t$ for the purpose of giving what is called a turn-over motion to the projecting steel-wire turners $f\,f$. $j$ is a regulation-roller for regulating the meshes, and is connected to the frame $a$, and operated by bevel-gears $u$, shaft $u'$, and worm-gear $v$. This regulation-roller is secured by a wire rope to the warp-drum $k$, and moves toward it with the whole frame $a$ at every revolution of the crank $m$. It is so conctructed that it may be thrown out of gear when required. A large warp-drum, $k$, is secured at one end of the track $c\,c$, upon which the straining-wires are rolled. Connected to it is a crank for turning it and a racket and pawl to tighten them.

The operation of making a wire fence is performed as follows: Longitudinal straining-wires are strained from the drum $k$ to the frame $l'$, at the opposite end of the track. Each wire passes through a tube, $g$, in the head-stocks. The bobbins $e$ are filled with small wire for lacing. The frame $a$ is placed at the extreme end of the track close to the frame $l'$. On each revolution of the crank the frame moves toward the drum $k$. The mesh-regulating roller $j$ is connected to the drum $k$ by the wire rope shown at $x$, and regulates each mesh. Upright wires are cut to the proper length, and are placed across the front of the wrappers $d\,d\,d\,d$, as shown, and are fastened to the outer longitudinal wires 1 1 1 1 by being looped over and fastened by means of the steel-faced turners $f\,f$. When the upright wire is ready to be looped a partial revolution of the crank $n^2$ operates the cam $s$ and gives motion to the lever $t$, which is connected to the spindle $g$, and pushes out the steel turners $f\,f$, and a further action causes them to revolve. The small projections on the face of the turners catch the ends of the upright wires and bends them over, forming a secure loop, and fastening around the outer straining-wires. The cams $s$ and levers $t$ are brought back to their position by weights 7 on one, and a spiral spring, 5, on the other side. The revolutions of the wrappers $d\,d$, &c., wind the small lacing-wire around the straining-wires 1 1 1 1, and fasten the upright ones to them at the point of contact. The straining-wire can be of any size and strength to suit the purpose for which it is intended, and any desired number may be used. Fancy patterns also may be constructed if needed.

The advantages of my wire-fencing machine, as above described, are as follows: 1st, plain and ornamental wire fences of almost any design can be constructed with ease. 2d, it is a labor-saving machine, as it will manufacture as much fencing in one day as ten men could make by hand in the same time. 3d, in making wire fencing by hand the workmen require to mark the spaces on a board. This is obviated by the use of the machine. Also, by hand, only one bar is laced at a time; by the machine the whole are laced at once. 5th, from two hundred to three hundred feet of fencing can be made per day by the machine, and only about twenty-five feet can be made by hand.

What I claim as my invention, and desire to secure by Letters Patent, is—

1. The arrangement and combination of the movable frame $a$, placed on a track with the mesh-regulating roller $j$ and warp-drum $k$, arranged substantially as described.

2. The arrangement of the head-stocks and wrappers *d q* with bobbins *e* and friction-rollers, as described.

3. The arrangement and combination of the outer wrappers producing the turn-over motion, operated by the cams *s* and levers *t*, as shown.

4. The arrangement of the driving-gear crank *m*, endless chain *o*, bevel-gears *r r*, cog-wheels *n*, regulating-worm and gear $r^2$, all combined and operated substantially in the manner and for the purpose described.

Hamilton, Canada, 13th May, 1871.

BENJAMIN GREENING.

Witnesses:
W. BRUCE,
WALTER ATHERTON.